US012682087B2

(12) United States Patent (10) Patent No.: US 12,682,087 B2
Bassi et al. (45) Date of Patent: Jul. 14, 2026

(54) SECURE COMMUNICATION BETWEEN INFORMATION TECHNOLOGY NETWORK AND OPERATIONAL TECHNOLOGY NETWORK

(71) Applicant: Honeywell International Inc., Charlotte, NC (US)

(72) Inventors: Atul Bassi, Bangalore (IN); Tarun Gupta, Bangalore (IN); Anubhav Misra, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 49 days.

(21) Appl. No.: 18/907,610

(22) Filed: Oct. 7, 2024

(65) Prior Publication Data

US 2025/0190595 A1 Jun. 12, 2025

(30) Foreign Application Priority Data

Dec. 11, 2023 (IN) .............................. 202311084535

(51) Int. Cl.
*G06F 21/60* (2013.01)
(52) U.S. Cl.
CPC .................................. *G06F 21/606* (2013.01)

(58) Field of Classification Search
CPC .... H04L 63/02; H04L 63/0209; G06F 21/606
See application file for complete search history.

(56) References Cited

U.S. PATENT DOCUMENTS

2025/0088376 A1* 3/2025 Ren ........................ H04L 9/3239
2025/0093858 A1* 3/2025 Narayanan ....... G05B 19/41835

* cited by examiner

*Primary Examiner* — Benjamin A Kaplan
(74) *Attorney, Agent, or Firm* — Alston & Bird LLP

(57) ABSTRACT

Techniques for secure communication between an operational technology (OT) network and an information technology (IT) network are described. In one aspect, for secure communication, a data diode comprising a transmitting end and a receiving end to facilitate unidirectional communication between a source network and a destination network is provided. The source and destination network are any one of the OT network and the IT network. Further, a folder-based data exchange module communicatively coupled to the receiving end of the data diode is provided to facilitate exchange of data between the source network and the destination network through one or more files, where the one or more files include data to be communicated between the OT network and the IT network. Further, the folder-based data exchange module comprises a first folder to store files designated for the destination network and a second folder to store files designated for the source network.

20 Claims, 10 Drawing Sheets

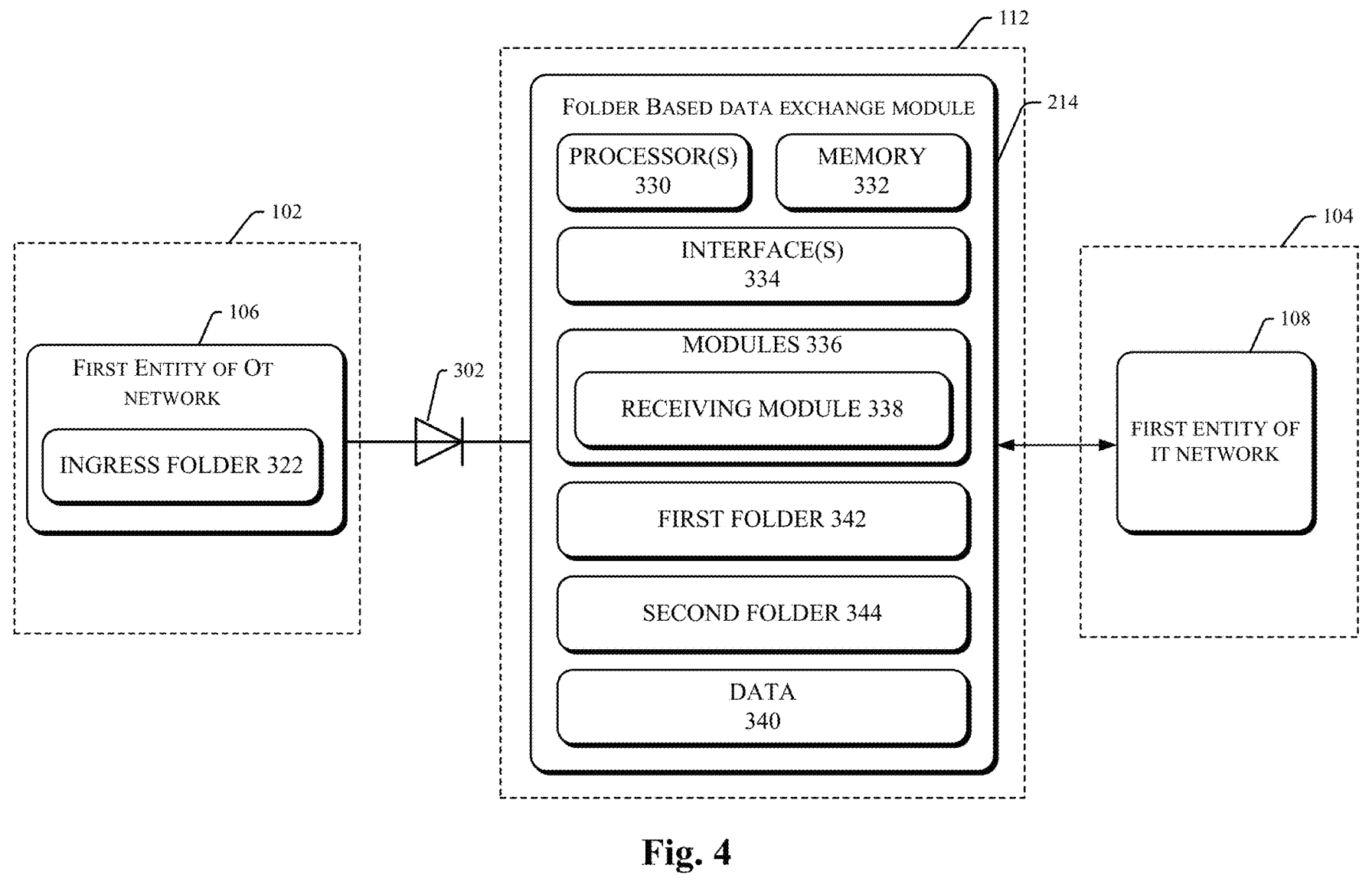

FOLDER BASED DATA EXCHANGE MODULE 214

PROCESSOR(S) 330

MEMORY 332

INTERFACE(S) 334

MODULES 336

RECEIVING MODULE 338

FIRST FOLDER 342

SECOND FOLDER 344

DATA 340

FIRST ENTITY OF IT NETWORK 108

FIRST ENTITY OF OT NETWORK 106

INGRESS FOLDER 322

Fig. 4

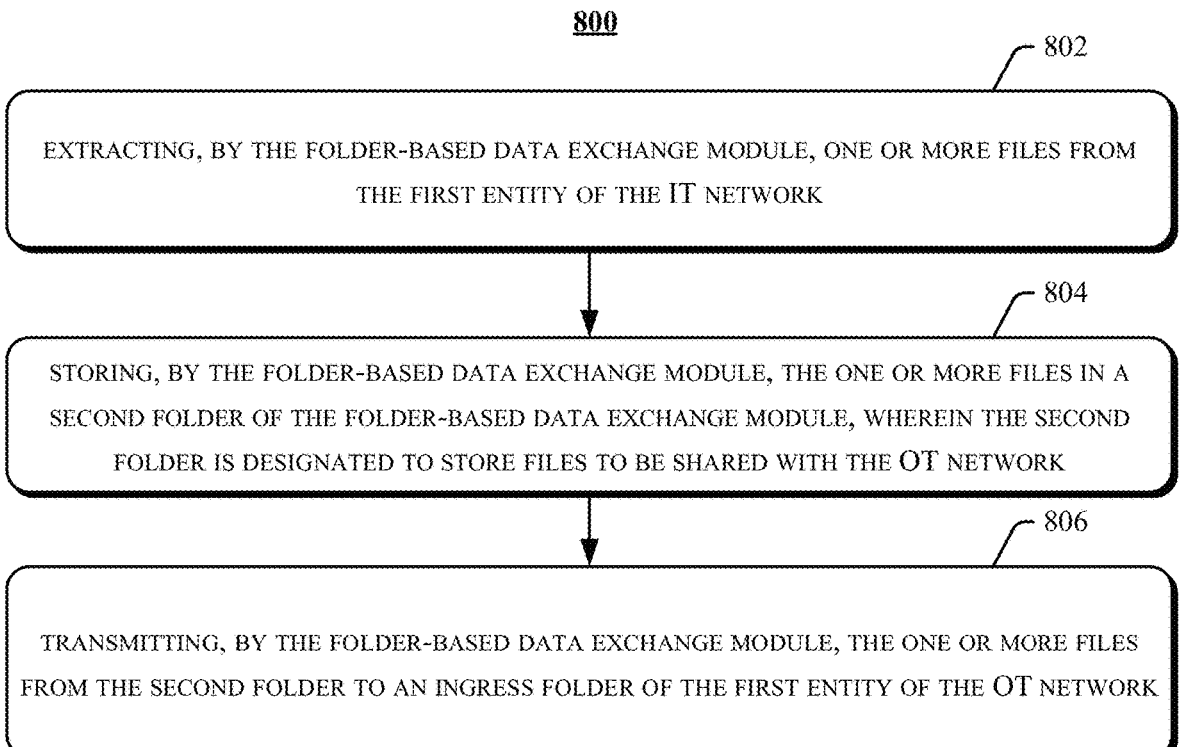

800

802

EXTRACTING, BY THE FOLDER-BASED DATA EXCHANGE MODULE, ONE OR MORE FILES FROM THE FIRST ENTITY OF THE IT NETWORK

804

STORING, BY THE FOLDER-BASED DATA EXCHANGE MODULE, THE ONE OR MORE FILES IN A SECOND FOLDER OF THE FOLDER-BASED DATA EXCHANGE MODULE, WHEREIN THE SECOND FOLDER IS DESIGNATED TO STORE FILES TO BE SHARED WITH THE OT NETWORK

806

TRANSMITTING, BY THE FOLDER-BASED DATA EXCHANGE MODULE, THE ONE OR MORE FILES FROM THE SECOND FOLDER TO AN INGRESS FOLDER OF THE FIRST ENTITY OF THE OT NETWORK

Fig. 8

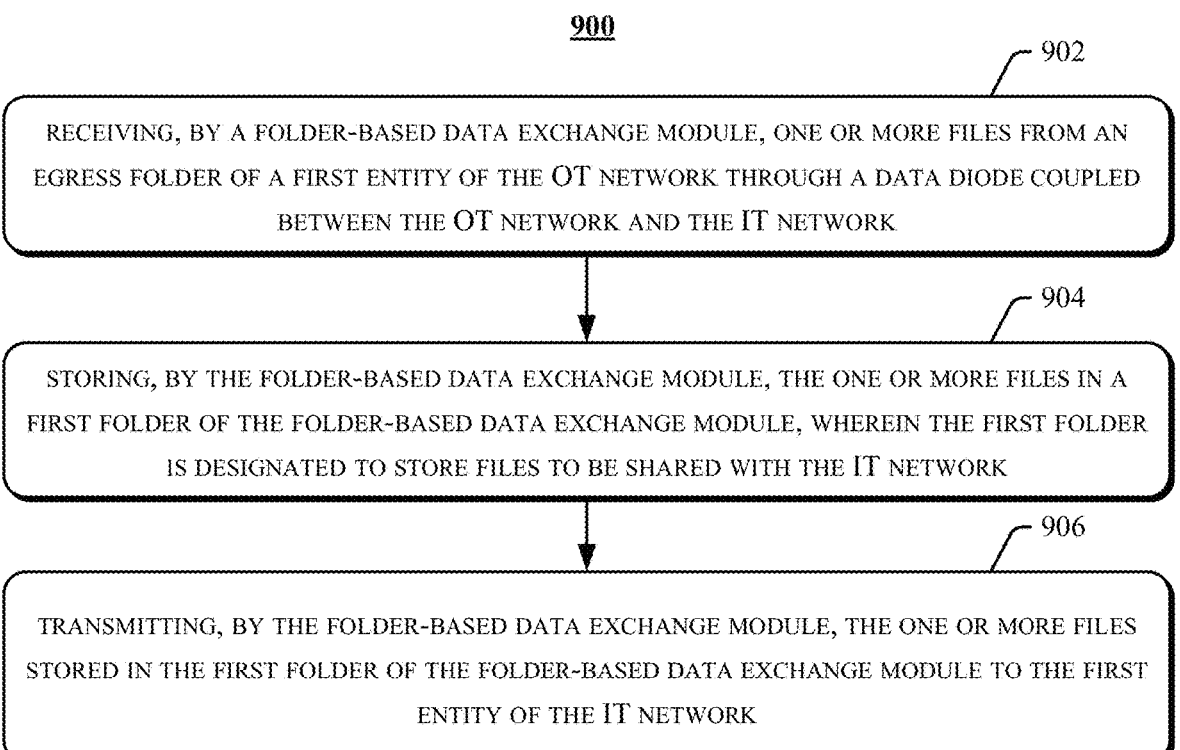

900

902

RECEIVING, BY A FOLDER-BASED DATA EXCHANGE MODULE, ONE OR MORE FILES FROM AN EGRESS FOLDER OF A FIRST ENTITY OF THE OT NETWORK THROUGH A DATA DIODE COUPLED BETWEEN THE OT NETWORK AND THE IT NETWORK

904

STORING, BY THE FOLDER-BASED DATA EXCHANGE MODULE, THE ONE OR MORE FILES IN A FIRST FOLDER OF THE FOLDER-BASED DATA EXCHANGE MODULE, WHEREIN THE FIRST FOLDER IS DESIGNATED TO STORE FILES TO BE SHARED WITH THE IT NETWORK

906

TRANSMITTING, BY THE FOLDER-BASED DATA EXCHANGE MODULE, THE ONE OR MORE FILES STORED IN THE FIRST FOLDER OF THE FOLDER-BASED DATA EXCHANGE MODULE TO THE FIRST ENTITY OF THE IT NETWORK

Fig. 9

SECURE COMMUNICATION BETWEEN INFORMATION TECHNOLOGY NETWORK AND OPERATIONAL TECHNOLOGY NETWORK

TECHNICAL FIELD

The present subject matter relates, in general, to communication between networks, and in particular to communication between an operational technology (OT) network and an information technology (IT) network.

BACKGROUND

Industrial facilities across various sectors such as oil, gas, mining, chemicals, energy, manufacturing, defense, and the like, typically encompass an operational technology (OT) network and an information technology (IT) network. Operational technology networks include specialized systems utilized in industrial environments to monitor and control physical processes, equipment, and infrastructure. These networks typically comprise components such as field devices (sensors, actuators, valves, motors), Programmable Logic Controllers (PLCs), Distributed Control Systems (DCS), Supervisory Control and Data Acquisition (SCADA) systems, and Human-Machine Interfaces (HMIs). Information Technology networks, on the other hand, deal with information processing and management for functions such as production scheduling, resource planning, logistics management, and the like. Generally, industrial facilities employ a Purdue model for Industrial Control System (ICS) security. The Purdue model typically includes five levels, out of which levels 0-3 represent the OT network and levels 4 and above represent the IT network. The Purdue model also defines a Demilitarized Zone (DMZ) which is created between the OT network and IT network.

SUMMARY

Aspects of the present subject matter provide techniques for secure communication between an operational technology (OT) network and an information technology (IT) network.

According to an example of the present subject matter, a system for secure communication between an operational technology (OT) network and an information technology (IT) network is provided. The system includes a data diode with a transmitting end and a receiving end to facilitate unidirectional communication between a source network and a destination network. The source network and the destination network are any one of the OT network and the IT network. Further, the system includes a folder-based data exchange module communicatively coupled to the receiving end of the data diode, where the folder-based data exchange module is to facilitate exchange of data between the source network and the destination network through one or more files. The one or more files include data to be communicated between the OT network and the IT network. Further, the folder-based data exchange module comprises a first folder to store the one or more files designated for the destination network and a second folder to store the one or more files designated for the source network.

According to another example of the present subject matter, a method for secure communication between an operational technology (OT) network and an information technology (IT) network is provided. The method includes receiving, by a folder-based data exchange module, one or more files from an egress folder of a first entity of the OT network through a data diode coupled between the OT network and the IT network, where the data diode is to facilitate unidirectional communication between the OT network and the IT network, and where the folder-based data exchange module is to facilitate exchange of data between the first entity of the OT network and a first entity of the IT network. Further, the method includes storing, by the folder-based data exchange module, the one or more files in a first folder of the folder-based data exchange module, where the first folder is designated to store files to be shared with the IT network and transmitting the one or more files stored in the first folder of the folder-based data exchange module to the first entity of the IT network.

According to another example of the present subject matter, a non-transitory computer readable medium containing program instruction is provided, that, when executed, causes the processor to extract one or more files from a first entity of the IT network, store the one or more files into a first folder, where the first folder is designated to store files to be shared with the OT network and transmit the one or more files from the first folder to an ingress folder of a first entity of the OT network through a data diode, where the data diode is to facilitate unidirectional communication between the OT network and the IT network.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 4 illustrates an example system for secure communication between the OT network and the IT network, in accordance with an example implementation of the present subject matter.

FIG. 8 illustrates an example method for secure communication between the OT network and the IT network, in accordance with an example implementation of the present subject matter.

FIG. 9 illustrates another example method for secure communication between the OT network and the IT network, in accordance with an example implementation of the present subject matter.

DETAILED DESCRIPTION

Figure 1:
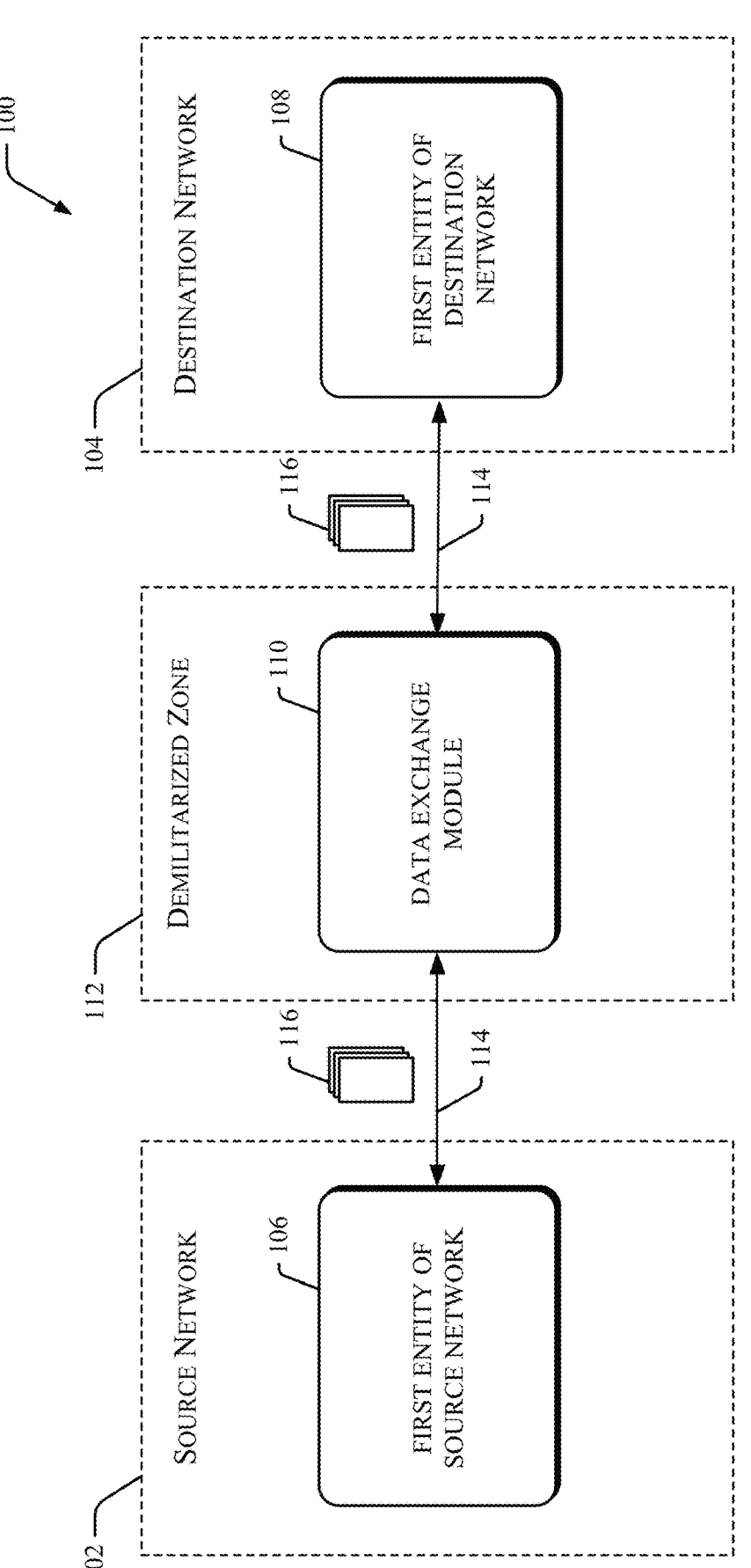
FIG. 1 illustrates a supply chain network environment, in accordance with an example implementation of the present subject matter.

The present subject matter relates to techniques for secure communication between an operational technology (OT) network and an information technology (IT) network. With increasing digital convergence of OT and IT networks, traditionally isolated OT networks which are confined to specific proprietary systems and networks may be exposed to external networks or the internet. Such exposure would potentially increase their vulnerability to cyber threats. To protect sensitive industrial networks, communication between OT networks and external networks, including IT networks, is typically restricted by employing a data diode. Data diodes enable the flow of data in only a single direction, i.e., data diodes only allow communication from the industrial networks to the external networks. Therefore, any type of communication from external networks (including the IT/organization networks) to their industrial OT networks is restricted by deploying data diodes in between these networks.

Additionally, data diodes not only prevent the flow of data from external networks into the industrial networks but also interfere with the communication between the two networks, which may further complicate OT network management and operations. This is because data diodes may alter the data being sent from a sender device to a receiver device, in the allowed direction. For example, on considering the example of a file being uploaded from a File Transfer Protocol (FTP) client employed in the sender network, such as the OT network, to an FTP server employed in the receiver network, such as the IT network, in data transmission protocols such as a Transmission Control Protocol (TCP) or Internet Protocol (IP), packets of data which are to be sent from the sender device to the receiver device are masked to protect the identity of the sender side. This includes protecting the identification of the sender device as well as the whole sender network from the receiver side. Typically, when a file is uploaded using an FTP client, the FTP client divides the file into separate chunks as defined in the FTP protocol. The operating system of the sender device converts these chunks into TCP segments, and then to IP packets, after which, the network interface of the sender device converts these IP packets into Ethernet frames and broadcasts them into the network. To protect the identity of the sender device from the receiver device, data diodes do not directly transfer Ethernet frames from the sender side to the receiver side. Instead, a software component running on the sender side of the data diode, such as a Transmitter, extracts only the data to be transmitted from the Ethernet frames and transmits the extracted data to the receiver side. A software deployed on the receiver side acts as a new FTP client to further send the extracted data received, to the FTP server in the receiver network. In this process, all sender information such as IP addresses, MAC addresses, and the like are removed and concealed from the receiver network. Therefore, the receiving FTP server sees the software deployed on the receiver side as the sender, without any information with respect to the original industrial network client. As a result, no entities on the receiver network obtain any network identification information about the sender network entities, thereby maintaining the isolation of the industrial network while allowing controlled, one-way data transfer.

Also, the software which is running on both sides of the data diode consists of multiple components, where each component is designed to support a specific communication protocol. For example, there may be one component for FTP protocol, another component for communication between Microsoft SQL server and client, and yet another component for HTTP protocol, and the like. Therefore, any communication beyond standardized protocols would be challenging, forming a communication barrier for any proprietary protocols that may be specific to some OT networks, beyond the standardized protocols, thereby imposing interoperability challenges when integrating different systems or implementing security measures across diverse industrial environments.

Data diodes, while effective at enforcing unidirectional data flow, may further pose significant challenges for certain OT operations where data from the enterprise level may need to be transferred to the facility, or where field devices of the facility need to be accessed from an enterprise level. For example, systems employed for monitoring the facility may require software updates at regular time intervals that are typically dispatched from their enterprise systems, or a cybersecurity solution may need to be employed on a field device of a particular facility by remotely accessing the said device by the enterprise network, or a field device may need to be remotely accessed to perform a maintenance operation which is initiated from the enterprise network, or to run a diagnostic application on a system of the facility which is initiated from the enterprise network, and the like. In such scenarios, since data diodes prohibit control of OT network from the IT network, enforcing operations in the OT network from the IT network becomes challenging. Therefore, the limitations imposed by data diodes, while enhancing security, can hinder important industrial processes and impede the full realization of digital transformation benefits in OT environments.

According to examples of the present subject matter, techniques for secure bi-directional communication between IT and OT networks are provided. The present subject matter provides a structured and controlled method for secure data exchange between the OT network and the IT network with a folder-based data exchange module, where exchange of data between the OT network and IT network is facilitated through exchange of files. In one aspect, data from one or more devices, equipment, or systems of a facility, which is a part of an OT network, may be collected and stored in an egress folder of a first entity of the OT network. For example, data from sensors, actuators, control systems, and the like, may be collected and stored in the egress folder.

The data stored in the egress folder may be designated for the IT network. This data may include, for example, operating values of an equipment of the facility, performance metrics, versions of software deployed in systems of the facility, current operating schedules being employed, and the like. This data, in the form of one or more files, may be transmitted to the folder-based data exchange module through a data diode, where the folder-based data exchange module may be coupled to a receiving end of the data diode. The one or more files received from the egress folder of the OT network may be stored in a first folder of the folder-based data exchange module. The first folder of the folder-based data exchange module may be utilized to store files designated for the IT network. Subsequently, the one or more files stored in the first folder of the folder-based data exchange module may be transmitted to the IT network.

Similarly, to facilitate exchange of data from the IT network to the OT network, one or more files designated for the OT network may be obtained by the folder-based data exchange module. These files may be stored in a second folder of the folder-based data exchange module, where the second folder is designated to store files to be shared with the OT network. To transmit files from the second folder of the folder-based data exchange module to the OT network, in one example, a flip operation may be triggered on the data diode. When a flip operation is triggered on the data diode, the direction of the data flow may be reversed, where the one or more files stored in the second folder of the folder-based data exchange module may be further transmitted to an ingress folder of the first entity of the OT network. The files stored in the ingress folder may be accessed by various devices of the OT network, thereby enabling bi-directional communication which takes place in a secure and controlled manner.

Therefore, the folder-based data exchange module behaves like a message relay between the source network and the destination network enabling secure bidirectional communication between OT and IT networks, while maintaining the integrity and operational continuity of industrial processes in modern industrial environments. Techniques of the present subject matter allow for the use of proprietary protocols through the folder-based data exchange system, thereby enhancing compatibility with existing OT infrastructure without compromising security. Additionally, techniques of the present subject matter improve manageability of OT and IT systems by facilitating controlled data flow for operations such as software updates, diagnostics, and remote maintenance. Also, techniques of the present subject matter may be integrated with the existing OT-IT infrastructure, thereby reducing implementation costs and complexity by allowing sharing of resources for processing & storage without requiring additional or separate hardware.

The above and other features, aspects, and advantages of the subject matter will be explained with regard to the following description and accompanying figures. It should be noted that the description and figures merely illustrate the principles of the present subject matter along with examples described herein and should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

FIG. 1 illustrates a supply chain environment 100, in accordance with an example implementation of the present subject matter. In one example, the supply chain environment 100 may be an enterprise including a source network 102 and a destination network 104 that are communicatively coupled to one another. In one example, the source network 102 may encompass a network of facilities (not shown in the figure). For example, a facility may be an industrial plant, an assembling unit of an automobile manufacturing company, a consumer-goods manufacturing unit, a pharmaceutical manufacturing unit, and the like. Similarly, in one example, the destination network 104 may include a network of organizations such as various business units, departments, and teams responsible for managing different aspects of the supply chain, such as procurement, production, logistics, inventory control, quality assurance, and the like. The network of facilities and the network of organizations may utilize both operational technology (OT) and information technology (IT) systems to coordinate activities, monitor performance, and facilitate decision-making across the entire supply chain network 100. In another example, the enterprise may extend beyond a single company to include partners, suppliers, and customers connected through shared systems and data flows.

In one example, communication between a first entity 106 of the source network 102 and a first entity 108 of the destination network 104 may be facilitated through a data exchange module 110 of a secure interface, such as a demilitarized zone (DMZ) 112, to ensure the integrity and confidentiality of data exchanged between the OT and IT environments. This communication may enable real-time monitoring of production processes, inventory levels, and logistics operations, allowing the destination network to make informed decisions and respond quickly to changes in supply and demand. In one example, the first entity 106 of the source network 102, the data exchange module 110 of the DMZ 112, and the first entity 108 of the destination network 104 may be implemented in any computing system, such as a storage array, a server, a desktop or a laptop, a computing device, a distributed computing system, or the like. Although not depicted, these entities may include other components, such as interfaces to communicate over the network or with external storage or computing devices, display, input/output interfaces, operating systems, applications, data, and other software or hardware components (not depicted for the sake of brevity).

In one example, the source network 102 may be an operational technology (OT) network and the destination network 104 may be an information technology (IT) network. In another example, the source network 102 may the IT network and the destination network 104 may be the OT network. The following description has been described with reference to the source network as the OT network and the destination network as the IT network and is not to be construed as a limitation. In one example, the first entity 106 of the source network 102 may communicate with the data exchange module 110 over a network 114. Similarly, the data exchange module 110 may communicate with the first entity 108 of the destination network 104 over the network 114. The network 114 may be a wireless network or a combination of a wired and wireless network. The network 114 can also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN). Depending on the terminology, the communication network includes various network entities, such as gateways and routers; however, such details have been omitted to maintain the brevity of the description.

In one example, the data exchange module 110 is to facilitate communication between the first entity 106 of the source network 102 and the first entity 108 of the destination network 104. In one example, data between the first entity 106 of the source network 102 and the first entity 108 of the destination network 104 may be exchanged through one or more files, where the one or more files include data to be communicated between the OT network and the IT network. In one example, the data exchange module 110 may include one folder to store data designated for the source network 102 and another folder designated to store data for the destination network 104. In one example, where the source network 102 is the OT network, data corresponding to the OT network may include data 116 collected from the facilities of the OT network, for example, data amongst other information, may include information associated with the operations, equipments, and processes of the facility. For example, in a facility, such as an industrial plant, the data 116 could indicate different types of equipments commissioned in the plant, maintenance logs of the various equipments, operating conditions for each of these equipments, personnel data, operating systems running on the local systems of each facility, and the like. Similarly, where the source network 102 is the IT network, data 116 amongst other information, may include updates for systems functioning in a facility, online diagnostic test routines to be performed on particular systems, updated for operational changes to be implemented, and the like.

In one example, data 116 from the source network 102 may be stored in the folders of the data exchange module 110, based on whether the data is designated for the OT network or the IT network, and accordingly transmitted to the destination network 104. Therefore, data exchange module 110 functions as a message relay between the OT network and the IT networks to enable secure bi-directional communication between the OT network and IT network.

Figure 2:
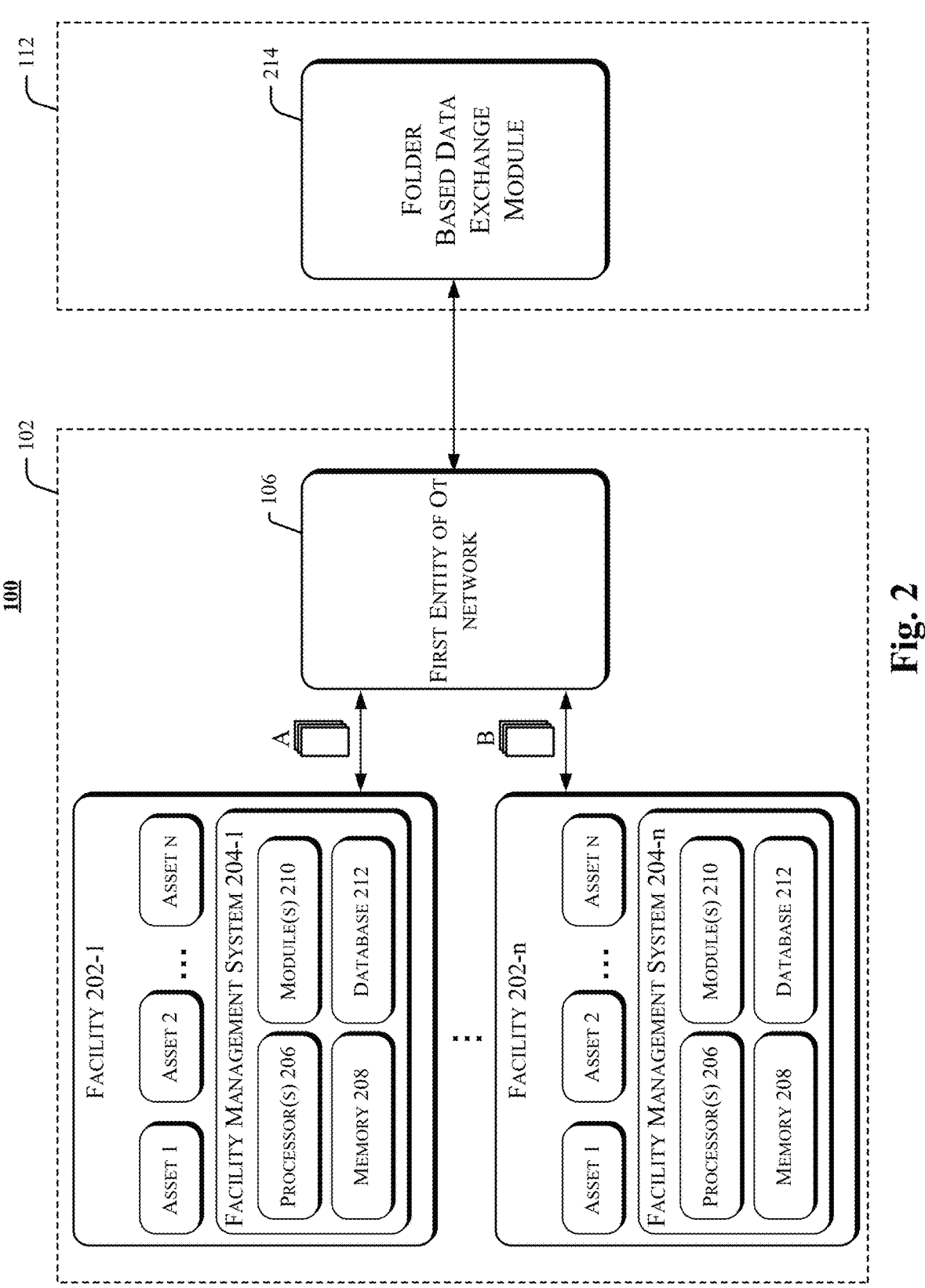
FIG. 2 illustrates an example operational technology network, in accordance with an example implementation of the present subject matter.

FIG. 2 illustrates an example supply chain network 100, in accordance with an example implementation of the present subject matter. In one example, an OT network 102 of the supply chain network 100 may include multiple facilities that are communicatively coupled to one another. In one example, the OT network 102 may include Facility 202-1 and Facility 202-n communicatively coupled to the first entity 106 of the OT network 102. For the sake of simplicity, the following description has been predominantly discussed with reference to Facility 202-1 and Facility 202-n of the supply chain network 100, communicatively coupled to the first entity 106 of the OT network 102. However, similar principles may be applicable to all facilities of a supply chain network coupled to the first entity 106 of the OT network 100.

In one example, Facility 202-1 of the OT network 102 may be located in a first geographical location and Facility 202-n may be located in a second geographical location of the OT network 102. Each of the facilities, Facility 202-1, and Facility 202-n, may include a facility management system 204-1, 204-n, respectively. In one example, the facility management system 204-1 of Facility 202-1 and the facility management system 204-n of Facility 202-n may be communicatively coupled to the first entity 106 of the OT network 102.

Further, each of the Facility 202-1 and Facility 202-n within the OT network 102 may include multiple assets: asset 1, asset 2, . . . asset-n, collectively referred to as an asset, associated with the various operations of the facility. For instance, the multiple assets of the facility may include equipments, field devices, processes, and systems of the facility, such as Programmable Logic Controllers (PLCs), conveyor systems, electrical equipment, industrial pumps, valves, and compressors, mixing and blending equipment used in process industries, quality control and inspection systems, Computer Numerical Control (CNC) machines, industrial furnaces, automated storage and retrieval systems (AS/RS), Supervisory Control and Data Acquisition (SCADA) systems for monitoring and controlling industrial processes, Human-Machine Interfaces (HMIs), Distributed Control Systems (DCS), sensors and actuators to measure and control various physical parameters throughout the facility, and the like. These interconnected assets may form an Industrial Internet of Things (IIoT) ecosystem, that enable efficient operation and management of the Facility 202-1 within the OT network 102.

Data A and data B from each of the assets of Facility 202-1 and Facility 202-n may be collected by the facility management systems 204-1 and 204-n, respectively. For example, data corresponding to each asset commissioned in the facility, sensor readings of process control variables such as vibration, pressure, temperatures, voltages, currents, flow rates, and the like, real-time performance metrics of each asset, asset health data, maintenance schedules, personnel information, logistic movements of products, operation schedules, transportation metrics, process adjustments, operator interactions, and the like.

For the sake of simplicity, the following description has been discussed with reference to the facility management system 204-1 of Facility 202-1, of the OT network 102. However, it may be understood that similar principles may be applicable to all other facilities of the OT network 102. In one example, the facility management system 204-1 includes a processor 206 and a memory 208. The processor (s) 206 may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, standard and/or custom, may also be included. The memory 208 may include any computer-readable medium including, for example, volatile memory (e.g., RAM), and/or non-volatile memory (e.g., EPROM, flash memory, etc.).

The facility management system 204-1 may further include modules 210, such as an asset monitoring module, process flow control module, data integration module, and the like (not shown). In one example, the modules 210 may be implemented as a combination of hardware and firmware. In examples described herein, such combinations of hardware and firmware may be implemented in several different ways. For example, the firmware for the module 210 may be processor 206 executable instructions stored on a non-transitory machine-readable storage medium and the hardware for the module 210 may include a processing resource (for example, implemented as either a single processor or a combination of multiple processors), to execute such instructions.

In the present examples, the machine-readable storage medium may store instructions that, when executed by the processing resource, implement the functionalities of the modules 210. In such examples, the facility management system 204-1 may include the machine-readable storage medium storing the instructions and the processing resource to execute the instructions. In other examples of the present subject matter, the machine-readable storage medium may be located at a different location but accessible to the facility management system 204-1 and the processor(s) 206.

The facility management system 204-1 may further include a database 212, that serves, amongst other things, as a repository for storing data A that may be fetched, processed, received, or generated by the modules. In one example, data A from Facility 202-1 and similarly, data B from Facility 202-n of the OT network 102 may be communicated to the first entity 106 of the OT network 102. In another example, the first entity 106 of the OT network may monitor and collect data from the multiple assets of the Facility 202-1. This data from the multiple assets of the facility may be designated for the IT network to support real-time decision making, process optimization, predictive maintenance, and long-term strategic planning. In one example, data from the first entity 106 of the OT network may be transmitted to a folder based data exchange module 214, where it may be temporarily stored in a folder designated to store data to be shared with the IT network (not shown in the figure). Subsequently, the folder-based data exchange module 214 may transmit the data stored in the folder to the IT network, a process which is further discussed with reference to FIG. 3. In one example, the folder-based data exchange module 214 may serve as a buffer, ensuring data integrity and managing the flow of information between the two networks for maintaining the security and operational stability of the OT network 102 while allowing the IT network to leverage operational data of the OT network 102.

Figure 3:
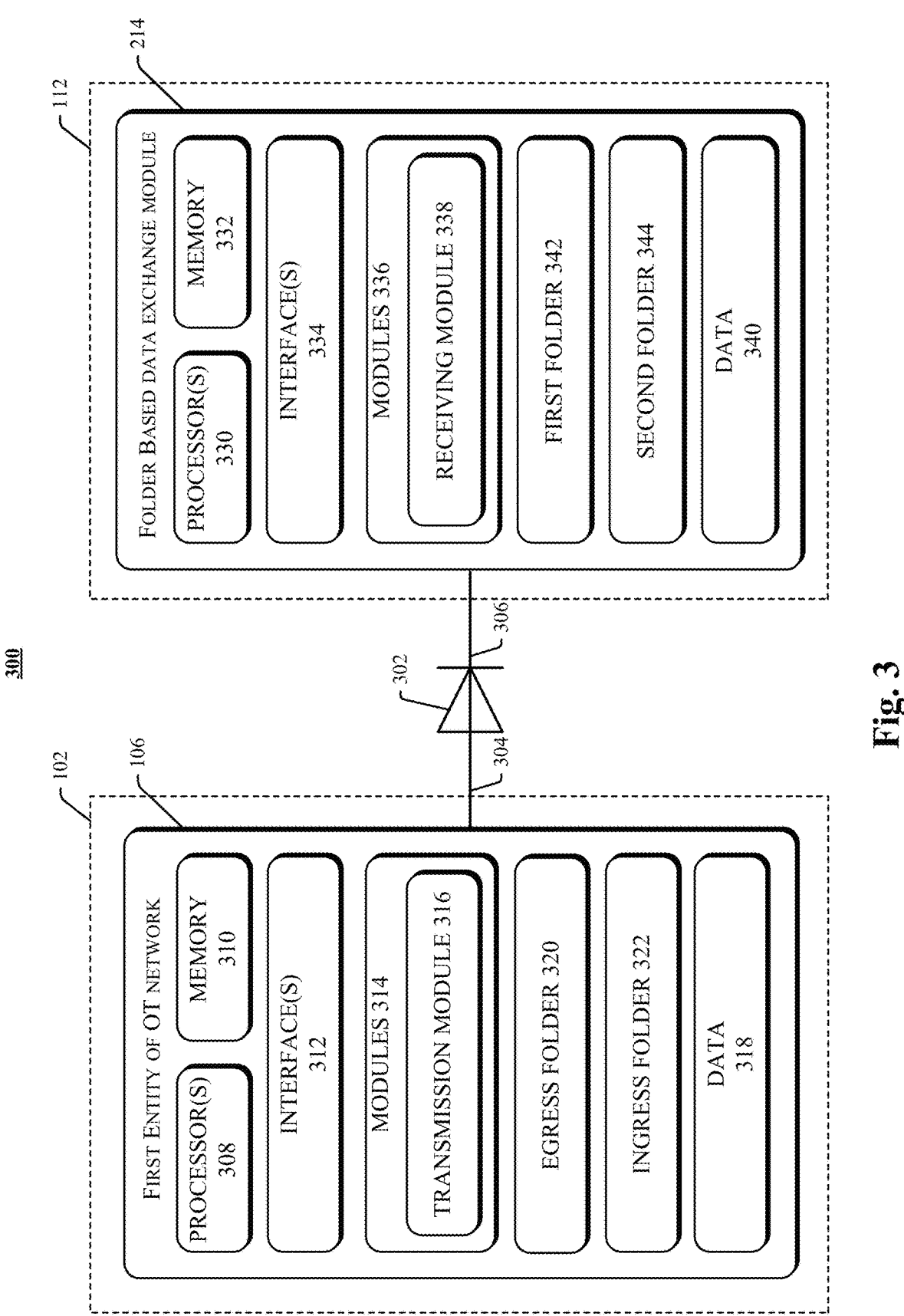
FIG. 3 illustrates a risk evaluating system, in accordance with an example implementation of the present subject matter.

FIG. 3 illustrates a system 300 for secure communication between an OT network and an IT network, in accordance with an example implementation of the present subject matter. In one example, the system 300 may include the first entity 106 of the OT network, a data diode 302, and the folder-based data exchange module 214. In another example, the system 300 may include the folder-based data exchange module 214 which may be communicatively coupled to the first entity 106 of the OT network that may be a part of another system, through the data diode 302. The data diode 302 is to facilitate unidirectional communication between the OT network 102 and the IT network (not represented in the figure), for example, facilitate data to be transmitted from the OT network 102 to the IT network.

In one example, the data diode 302 may be communicatively coupled to the first entity 106 of the OT network 102 and the folder based data exchange module 214, where the folder-based data exchange module 214 may be in a demilitarized zone (DMZ) 112 of the OT network. In one example, the DMZ may be a virtual demarcation in the OT network 102. In one example, a transmitting end 304 of the data diode 302 may be coupled to the first entity 106 of the OT network 102 and a receiving end 306 of the data diode 302 may be coupled to the folder based data exchange module 214, which allows data to be transferred from the first entity 106 of the OT network 102 to the folder-based data exchange module 214. In one example, data from the first entity 106 of the OT network 102 may be transmitted to the folder-based data exchange module 214 in the form of one or more files. The one or more files may include data to be communicated between the OT network and the IT network.

In one example, the first entity 106 of the OT network 102 may include a processor 308 and a memory 310 coupled to the processor 308. The functions of functional block labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), nonvolatile storage. Other hardware, standard and/or custom, may also be included. Further, an interface(s) 312 may allow the connection or coupling of the first entity 106 of the OT network 102 with one or more other devices (say devices or systems within the supply chain network), through a wired (e.g., Local Area Network, i.e., LAN) connection or through a wireless connection (e.g., Bluetooth®, Wi-Fi). The interface(s) 312 may also enable intercommunication between different logical as well as hardware components of the first entity 106.

The memory 310 may include any computer-readable medium including, for example, volatile memory (e.g., RAM), and/or non-volatile memory (e.g., EPROM, flash memory, etc.).

The first entity 106 may further include modules 314, such as a transmission module 316. The module(s) 314, in one example, may be implemented as a combination of hardware and firmware. In examples described herein, such combinations of hardware and firmware may be implemented in several different ways. For example, the firmware for the module may be processor executable instructions stored on a non-transitory machine-readable storage medium and the hardware for the module may include a processing resource (for example, implemented as either a single processor or a combination of multiple processors), to execute such instructions.

In the present examples, the machine-readable storage medium may store instructions that, when executed by the processing resource, implement the functionalities of the module(s) 314. In such examples, the first entity 106 may include the machine-readable storage medium storing the instructions and the processing resource to execute the instructions. In other examples of the present subject matter, the machine-readable storage medium may be located at a different location but accessible to the first entity 106 and the processor 308.

The first entity 106 may further include data 318, that serves, amongst other things, as a repository for storing data that may be fetched, processed, received, or generated by the modules 314. The data 318 may include asset data, types of assets, sensor readings, equipment data, facility data, data associated with systems installed across various facilities, personnel data, operational schedules, performance metrics of multiple equipment, various threshold and pre-determined data, maintenance schedules, process control variables, health status data corresponding to various equipment across multiple facilities, and the like. In an example, the data 318 may be stored in the memory 304.

Further, in one example, the first entity 106 of the OT network 102 may include an egress folder 320 and an ingress folder 322. The egress folder 320 may be to store data that is designated for the IT network and the ingress folder 322 may be to store data that is designated for the OT network 102.

In one example, the first entity 106 of the OT network 102 may obtain data which is to be communicated to the IT network. For example, data from one or more assets of the facility, which is to be transmitted to the IT network, may be collected and stored in the egress folder 320. In one example, the first entity 106 of the OT network may monitor the one or more assets and collect data to be transmitted to the IT network. In another example, the first entity 106 of the OT network may receive data to be communicated to the IT network, for example, from a facility management system of the facility. In one example, the data obtained from the facility may include operational parameters such as temperature, pressure, flow rate, vibration, and the like obtained from sensors and actuators coupled to the assets of the facility, or performance data from monitoring systems such as SCADA, PLCs, DCS, and the like, or data corresponding to the personnel of the facility, operational schedules, logistic schedules, health reports of various assets, information associated with various systems running in each facility, and the like. This data from the multiple assets of the facility may be designated for the IT network to support real-time decision making, process optimization, predictive maintenance, and long-term strategic planning. For example, if data from a facility such as a smart power grid is to be shared with a business unit of the IT network, for example, a unit that is managing energy distribution and demand response, real-time operational data from multiple components of the power grid may be collected. This data may include voltage readings from substations, current measurements from transmission lines, power output from various generation sources like solar farms and wind turbines, and consumption data from smart meters at consumer endpoints. Additionally, data may be collected from various control systems such as Supervisory Control and Data Acquisition (SCADA) systems monitoring grid stability and load balancing, Programmable Logic Controllers (PLCs) controlling circuit breakers and switches, Distributed Control Systems (DCS) managing power flow across the network, and Human-Machine Interfaces (HMIs) recording grid operator actions and system alerts. All this data which is to be shared with the IT network may be stored in the egress folder 320. The data in the egress folder 320 may then be securely transmitted to the IT network, where it can be analyzed to optimize energy distribution, predict peak demand periods, implement dynamic pricing strategies, improve overall grid reliability and efficiency, and the like.

In one example, the egress folder 320 may be monitored in real-time. In another example, the egress folder 320 may be monitored at pre-determined time intervals, for example, every 1 minute, 5 minutes, 1 hour, or 24 hours, and the like. The pre-determined time interval may be based on various factors such as the criticality of the data, network bandwidth constraints, or the frequency at which data from the OT network is to be transmitted to the IT network, and the like. In one example, a Server Message Block (SMB) protocol may be utilized for monitoring the egress folder 320. Further, upon detection of a new file in the egress folder 320, the first entity 106 of the OT network 102 may initiate the transmission of the data to the folder-based data exchange module 214. The data from the egress folder 320 may be transmitted to the folder-based data exchange module 214 in the form of one or more files. These files may be in various formats such as CSV, JSON, XML, or binary formats, depending on the nature of the data and the requirements of the receiving systems in the IT network. In one example, the transmission module of the first entity of the OT network may be coupled to a receiving module of the folder-based data exchange module through an optical fiber.

On receiving the one or more files from the first entity 106 of the OT network 102, in one example, the folder based data exchange module 214 may store the data received in a folder designated to store data to be communicated to the IT network. In one example, the folder-based data exchange module 214 may include a processor 330 and a memory 332 coupled to the processor 330. The functions of functional block labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, standard and/or custom, may also be included. Further, an interface(s) 334 may allow the connection or coupling of the folder based data exchange module 214 with one or more other devices (say devices or systems within the supply chain network), through a wired (e.g., Local Area Network, i.e., LAN) connection or through a wireless connection (e.g., Bluetooth®, Wi-Fi). The interface(s) 334 may also enable intercommunication between different logical as well as hardware components of the folder based data exchange module 214.

The memory 332 may include any computer-readable medium including, for example, volatile memory (e.g., RAM), and/or non-volatile memory (e.g., EPROM, flash memory, etc.).

The folder based data exchange module 214 may further include modules 336, such as a receiving module 338. The module(s) 336, in one example, may be implemented as a combination of hardware and firmware. In examples described herein, such combinations of hardware and firmware may be implemented in several different ways. For example, the firmware for the module may be processor executable instructions stored on a non-transitory machine-readable storage medium and the hardware for the module may include a processing resource (for example, implemented as either a single processor or a combination of multiple processors), to execute such instructions.

In the present examples, the machine-readable storage medium may store instructions that, when executed by the processing resource, implement the functionalities of the module(s) 336. In such examples, the folder-based data exchange module 214 may include the machine-readable storage medium storing the instructions and the processing resource to execute the instructions. In other examples of the present subject matter, the machine-readable storage medium may be located at a different location but accessible to the folder-based data exchange module 214 and the processor 330.

The folder-based data exchange module 214 may further include data 340, that serves, amongst other things, as a repository for storing data that may be fetched, processed, received, or generated by the modules 336. The data 340 may include data received from the OT network, as well as data received from the IT network. In an example, the data 340 may be stored in the memory 304.

Further, to facilitate exchange of data between the first entity 106 of the OT network 102 and the IT network, the folder based data exchange module 214 may further include a first folder 342 and a second folder 344. In one example, the first folder 342 may be to store data designated for the IT network and the second folder 344 may be to store data designated for the OT network. In one example, the one or more files received from the egress folder 320 of the first entity 106 of the OT network 102 may be stored in the first folder 342. On considering the example as discussed above, the data associated with the power grid corresponding to voltage readings, current measurements, power output data, consumption data, control data SCADA systems, PLCs, DCS, and the like, which was stored in the egress folder 320 may be stored in the first folder 342. The data stored in the first folder 342 may subsequently be transmitted to IT network. In another example, any file that may be written into the first folder 342 may be transmitted to the IT network. Similar to the transmission of data from the egress folder 320 to the first folder 342, data from the first folder 342 may be transmitted to the IT network in the form of one or more files.

In one example, the one or more files from the first folder 342 of the folder-based data exchange module 214 may be transmitted to a first entity 108 of the IT network 104 as depicted in FIG. 4. In one example, the first entity 108 of the IT network 104 may be a resource planning platform, or an application designed to analyze industrial data, and the like. For example, but not limited to, the first entity 108 of the IT network 104 may utilize the data obtained from the first folder 342 to generate insights for improving operational efficiency, reducing downtime, optimizing resource allocation, or enhancing product quality of the facility, and the like.

In one example, the insights and recommendations, amongst other data may be generated to perform one or more actions in the facility of the OT network 102. Considering the example of the power grid as discussed above, various types of data may need to be shared from the IT network to the OT network to optimize operations and maintain grid stability. For example, this data may include updated demand forecasts based on weather predictions and historical usage patterns, dynamic pricing information for smart meters, cybersecurity updates for critical infrastructure components, and the like. The IT network 104 may also need to transmit new setpoints for voltage regulation and reactive power control, maintenance schedules derived from predictive analytics, and revised load shedding priorities for emergency situations. Additionally, firmware updates for smart grid devices, updated operational parameters for renewable energy sources, new configuration files for protective relays, and improved algorithms for automatic generation control systems may need to be transferred. In one example, all of this data may be generated by the first entity 108 of the IT network 104. In one example, the data from the first entity 108 of the IT network 104 may be transmitted to the folder-based data exchange module 214 in the form of one or more files.

In one example, the second folder 344 of the folder-based data exchange module 214 may be to store the one or more files designated for the OT network 102. In another example, data which is to be transmitted to the OT network 102 may be extracted from the first entity 108 of the IT network 104 and stored in the second folder 344. Considering the example of the power-grid as discussed above, data such as firmware updates, new operational set-points, revised load shedding patterns, updated demand forecasts, and the like, may be stored in the second folder 344. Subsequently, data in the form of one or more files may be transmitted from the second folder 344 to the ingress folder 322 of the first entity 106 of the OT network 102.

In one example, to reverse the flow of data across the unidirectional data diode 302, which allows transmission of data from the OT network 102 to the IT network 104, a flip operation on the data diode 302 may be triggered. On triggering the flip operation on the data diode 302, the one or more files stored in the second folder 344 of the folder-based data exchange module 214 may be transmitted to the ingress folder 322 of the first entity 106 of the OT network 102. In one example, the data diode 302 may be triggered at pre-determined time intervals, for example, every 2 hours or every 2 days, and the like. In another example, to facilitate the flow of data from the folder-based exchange module to the OT network 102, a second data diode may be provided between the folder-based data exchange module 214 and the OT network 102. The second data diode may allow the one or more files stored in the second folder 344 of the folder-based data exchange module 214 to be transmitted to the ingress folder 322 of the first entity 106 of the OT network 102. The second data diode, along with the data diode 302, may facilitate simultaneous flow of data between the folder-based data exchange module 214 and the OT network 102 in both directions.

In another example, an operator of the facility may initiate a trigger operation on the data diode 302 to allow data from the second folder 344 of the folder based data exchange module 214 to be transmitted to the first entity 106 of the OT network 102 to ensure security of the OT network 102. In one example, the facility management system of a facility may access this data stored in the ingress folder 322 to implement an action, for example, initiate an update in software, or modify the operating limits of an equipment of the facility to optimize the production, and the like. Therefore, the folder-based data exchange module 214 functions as a message relay between the OT network 102 and the IT network 104 to enable secure bi-directional communication between the OT network 102 and IT network 104.

Figure 5:
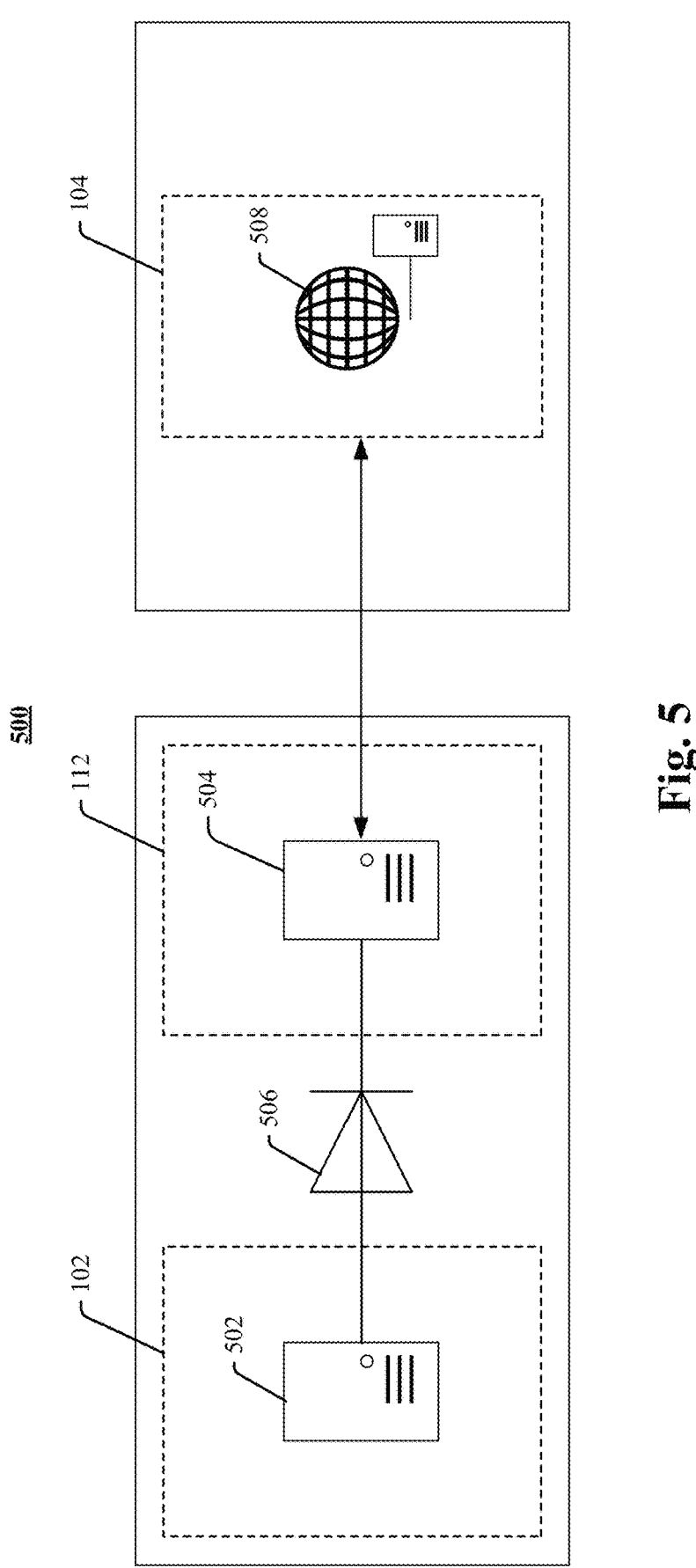
FIG. 5 illustrates an example of secure communication between the OT network and the IT network, in accordance with an example implementation of the present subject matter.

FIG. 5 illustrates an example of secure communication between an OT network and an IT network, in accordance with an example implementation of the present subject matter. The following example is only to elucidate principles of the present subject matter and is not to be construed as a limitation. In one example, on considering a facility 500 such as a petrochemical refinery of the OT network 102, data from various assets across the production line may be collected by a first entity 502 of the facility 500. In one example, the first entity 502 may be a facility data collector. For example, data from temperature sensors coupled to reaction vessels, pressure gauges positioned on pipelines, programmable logic controllers (PLCs), SCADA systems, and the like may be collected. In one example, such data may be collected at scheduled intervals, such as every 30 minutes or every 1 hour. In one example, the data collected from multiple assets of the facility 500 may be aggregated into one or more files and stored in a folder of the first entity 502. The one or more files may include data associated with multiple assets, such as crude oil throughput, product yields, energy consumption, equipment performance metrics, quality control parameters, and the like, which may be stored in an egress folder of the first entity 502 of the OT network 102. The egress folder may be to store files designated for the IT network.

In one example, at scheduled intervals, the one or more files stored in the egress folder may be securely transmitted through a data diode 506 to a first folder of folder-based data exchange module 504. In one example, the folder-based data exchange module 504 may be coupled to a receiver end of the data diode 506 and may be provided in the DMZ 112 of the OT network. In one example, the first folder of the folder-based data exchange module 504 may be to store files designated for the IT network.

From the first folder of the folder-based data exchange module 504, the one or more files may then be transmitted to a remote gateway server 508 of the IT network 104, where the files may be further processed. In one example, an IT team may access these files and utilize the data to generate, for example, recommended actions corresponding to production optimization strategies, or may generate predictive maintenance schedules, and energy efficiency recommendations, and the like. Further, in one example, the IT team may compile these insights into one or more files which may include updated production targets, maintenance work orders, and new setpoints for various process units that are to be implemented across multiple assets of the facility 500. These files may then be transmitted to the folder based data exchange module 504, where these files may be stored in a second folder of the folder-based data exchange module 504. The second folder of the folder-based data exchange module 504 is to store files designated for the OT network.

During a scheduled flip operation of the data diode 506, the files stored in the second folder of the folder-based data exchange module 504 may be transmitted back to the OT network and stored in the ingress folder of the first entity 502 of the facility 500. In one example, an operator, such as a facility manager of the facility 500 may initiate the flip operation. In another example, the flip operation may be triggered at pre-determined time intervals, for example, every 6 hours, or the like.

Further, files stored in the ingress folder may be accessed by various systems within the facility 500. For instance, based on the data accesses from the files stored in the ingress folder, the production management system may adjust manufacturing schedules, the energy management system might implement new efficiency protocols, the maintenance team could initiate preventive repairs based on the predictive analytics, PLCs may receive updated setpoints to optimize chemical reactions, the quality control system might adjust its parameters based on the latest product specifications, and the like. This bidirectional flow of information, facilitated by the folder-based data exchange system 504 and the data diode 506, allows the facility to operate more efficiently, while maintaining a secure separation between its OT and IT networks.

Figure 6:
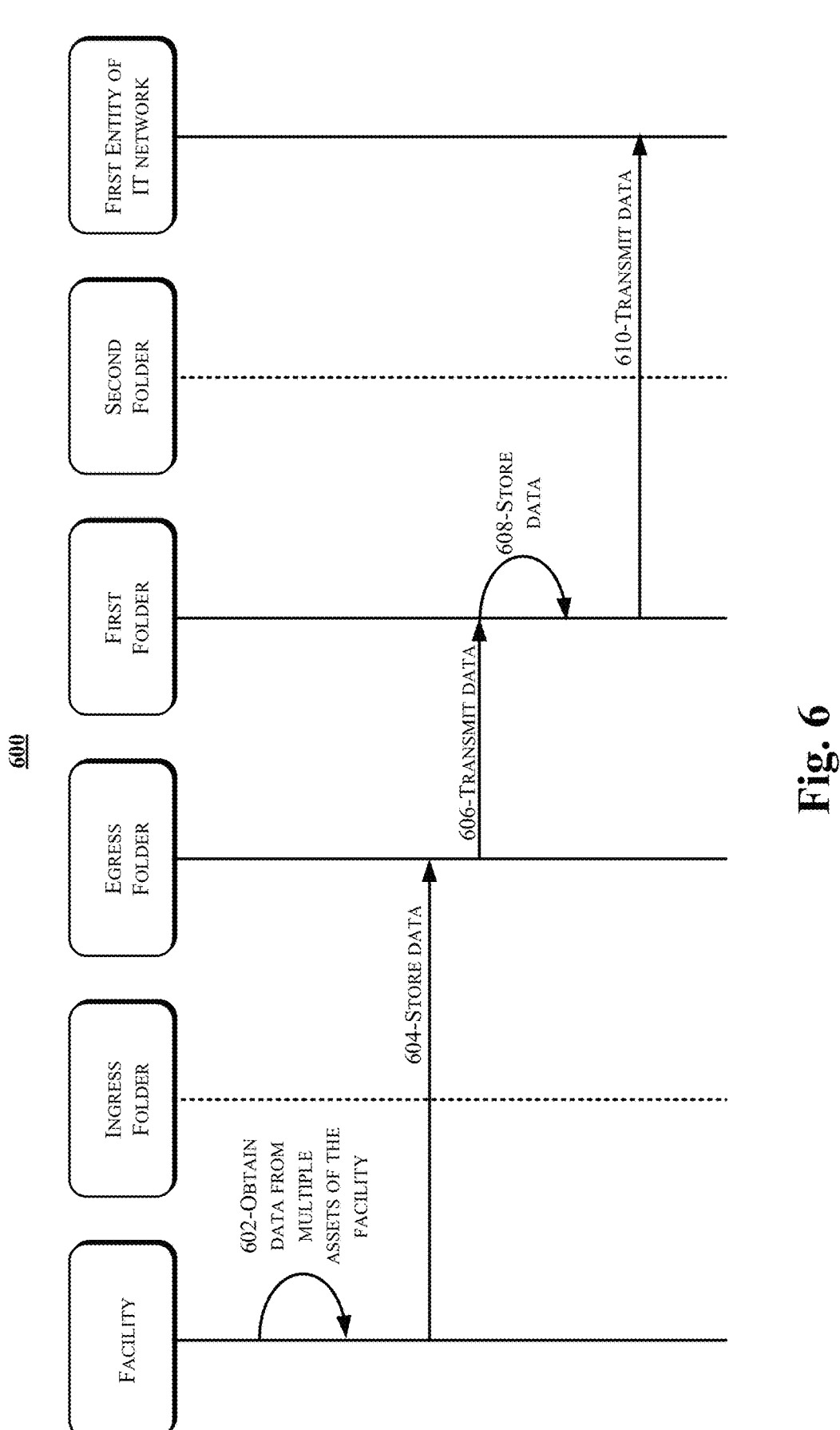
FIG. 6 illustrates a call flow for communication from the OT network to the IT network, in accordance with an example implementation of the present subject matter.

FIG. 6 illustrates a call flow 600 for communication from the OT network to the IT network, in accordance with an example implementation of the present subject matter.

At step 602 of the call flow 600, a first entity of the OT network obtains data from one or more assets of a facility. These assets may include sensors, actuators, PLCs, DCS, or other industrial equipment, processes and systems.

At step 604 of the call flow 600, data collected from the one or more assets is aggregated and stored as one or more files in an egress folder of the first entity of the OT network, where the egress folder is designated to store files to be shared with the IT network. In one example, a TCP/IP protocol may be used to transfer the data to the egress folder. Further, in one example, the egress folder may be monitored to detect the presence of a file. In one example, an SMB protocol may be utilized to monitor the egress folder. As would be understood to a person skilled in the art, the present subject matter has been discussed with reference to a TCP/IP protocol and an SMB protocol. However, similar principles may be applicable to other communication protocols.

At step 606 of the call flow 600, the one or more files stored in the egress folder are transmitted to a first folder of the folder-based data exchange module through a data diode. In one example, the transmission process may involve a Unidirectional Gateway Connector on the transmitting side of the data diode, which uses TCP/IP protocol to ensure reliable file transfer.

At step 608 of the call flow 600, the files received from the egress folder are stored in the first folder of the folder-based data exchange module.

At step 610 of the call flow 600, the files from the first folder of folder-based data exchange are further transmitted to a first entity of the IT network. In one example, the first entity of the IT network may be a remote gateway server of the enterprise, which can then distribute the data to various IT systems for analysis and processing.

Therefore, the call flow 600 ensures secure unidirectional transfer of operational data from the OT network to the IT network, maintaining data integrity between these networks while allowing necessary information sharing for business intelligence and operational optimization.

Figure 7:
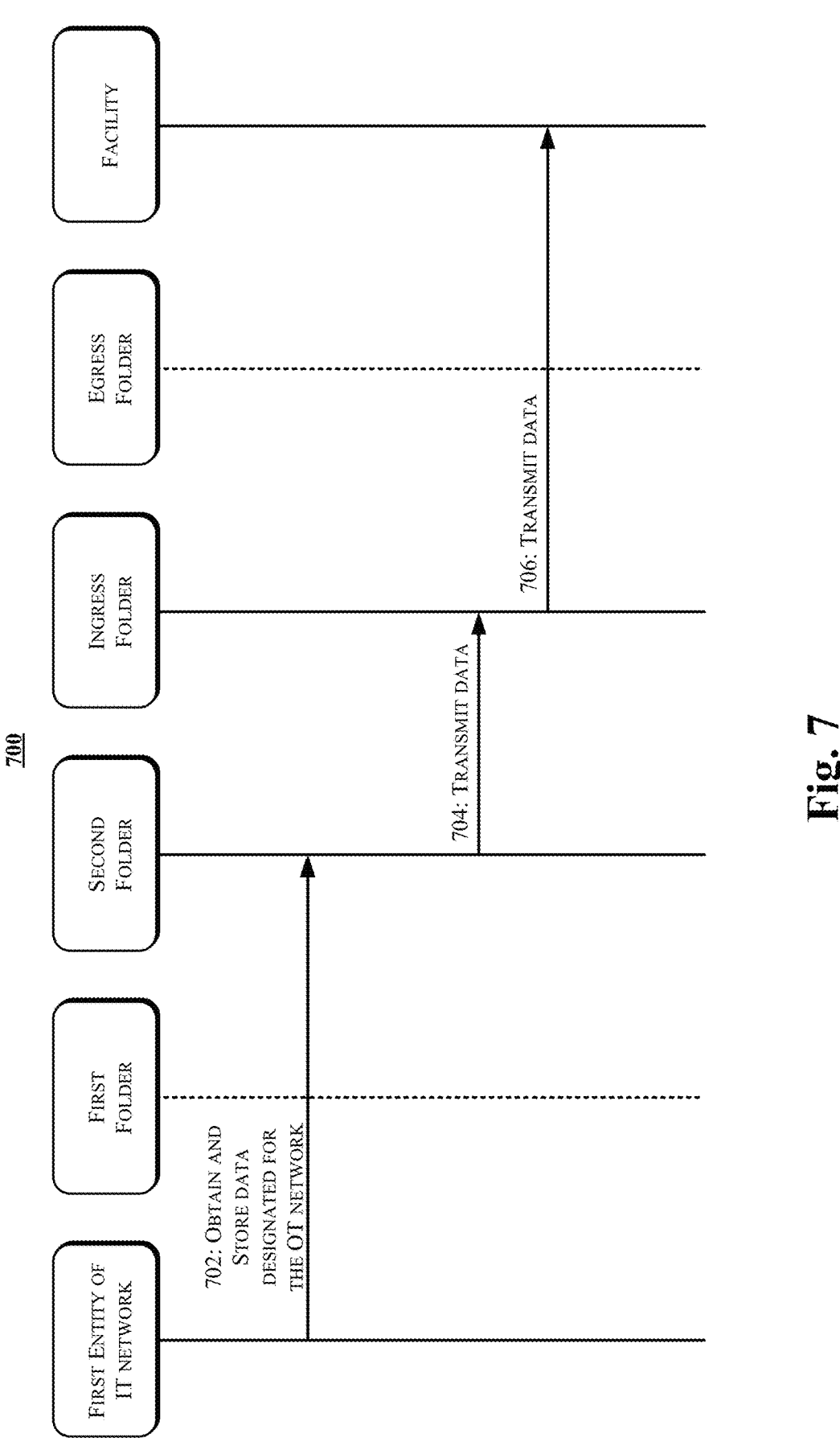
FIG. 7 illustrates a call flow for communication from the IT network to the OT network, in accordance with an example implementation of the present subject matter.

FIG. 7 illustrates a call flow 700 for communication from the IT network to the OT network, in accordance with an example implementation of the present subject matter.

At step 702 of the call flow 700, data in the form of one or more files is obtained from a first entity of the IT network. In one example, the data may include updated operational parameters, maintenance schedules, firmware updates, control setpoints, or the like. For instance, the data may include a new temperature and pressure set point for a chemical reactor with updated production targets for the next 24 hours, and the like. The one or more files received from the first entity of the IT network is stored in a second folder of the folder-based data exchange module.

At step 704 of the call flow 700, the one or more files stored in the second folder are transmitted to the ingress folder of the first entity of the OT network through the data diode. In one example, the one or more files are transmitted to the ingress folder on triggering a flip operation of the data diode. In one example, transmission of the one or more files from the second folder to the ingress folder may take place through the SMB protocol.

At step 706 of the call flow 700, the one or more files stored in the ingress folder may be extracted and distributed to one or more systems or devices within the OT network. For example, new setpoints might be sent to the Distributed Control System, maintenance schedules may be sent to a Computerized Maintenance Management System, or firmware updates may be sent to specific field devices of the facility, and the like.

Therefore, the call flow 700 enables secure and controlled transfer of data from the IT network to the OT network, maintaining data integrity while allowing necessary updates and instructions to be implemented in the operational environment. The use of the folder-based data exchange module and the flip operation on the data diode ensures that this bi-directional communication between the IT network and the OT network occurs in a structured and secure manner that preserves the isolation of the OT network.

FIG. 8 illustrates an example method 800 for secure communication an operational technology (OT) network and an information technology (IT) network, in accordance with an example implementation of the present subject matter. The order in which the method 800 is described is not intended to be construed as a limitation, and any number of the described method blocks can be combined in any order to implement method 800 or an alternative method. Additionally, individual blocks may be deleted from the method 800 without departing from the spirit and scope of the subject matter described herein. Furthermore, the method 800 may be implemented in any suitable hardware, computer readable instructions, firmware, or combination thereof. For discussion, the method 800 is described with reference to the implementations illustrated in FIGS. 1-7.

At block 802, the method 800 includes receiving, by a folder-based data exchange module, one or more files from an egress folder of a first entity of the OT network. In one example, the one or more files are received through a data diode coupled between the OT network and the IT network, where the data diode is to facilitate unidirectional communication between the OT network and the IT network. In one example, the folder-based data exchange module may be coupled to a receiving end of the data diode and the first entity of the OT network may be coupled to the transmitting end of the data diode. Further, the folder-based data exchange module is to facilitate exchange of data between the first entity of the OT network and a first entity of the IT network. In one example, the folder-based data exchange module may be provided in a demilitarized zone (DMZ) of the OT network.

At block 804, the method 800 includes storing, by the folder-based data exchange module, the one or more files in a first folder of the folder-based data exchange module, where the first folder is designated to store files to be shared with the IT network.

At block 806, the method 800 includes transmitting, by the folder-based data exchange module, the one or more files stored in the first folder of the folder-based data exchange module to the first entity of the IT network.

FIG. 9 illustrates another method 900 for secure communication between an operational technology (OT) network and an information technology (IT) network, in accordance with an example implementation of the present subject matter. The order in which the method 900 is described is not intended to be construed as a limitation, and any number of the described method blocks can be combined in any order to implement method 900 or an alternative method. Additionally, individual blocks may be deleted from the method 900 without departing from the spirit and scope of the subject matter described herein. Furthermore, the method 900 may be implemented in any suitable hardware, computer readable instructions, firmware, or combination thereof. For discussion, the method 900 is described with reference to the implementations illustrated in FIGS. 1-7.

At block 902, the method 900 extracting, by the folder-based data exchange module, one or more files from the first entity of the IT network.

At block 904, the method 900 includes storing, by the folder-based data exchange module, the one or more files in a second folder of the folder-based data exchange module, where the second folder is designated to store files to be shared with the OT network.

At block 906, the method 900 includes transmitting, by the folder-based data exchange module, the one or more files from the second folder to an ingress folder of the first entity of the OT network. In one example, the ingress folder may be to store one or more files designated for the OT network. in one example, the one or more files from the second folder of the folder-based data exchange module may be transmitted to the ingress folder of the first entity, when a flip operation is performed on the data diode to reverse the direction of data flow. In one example, the flip operation may be triggered at pre-determined time intervals.

Figure 10:
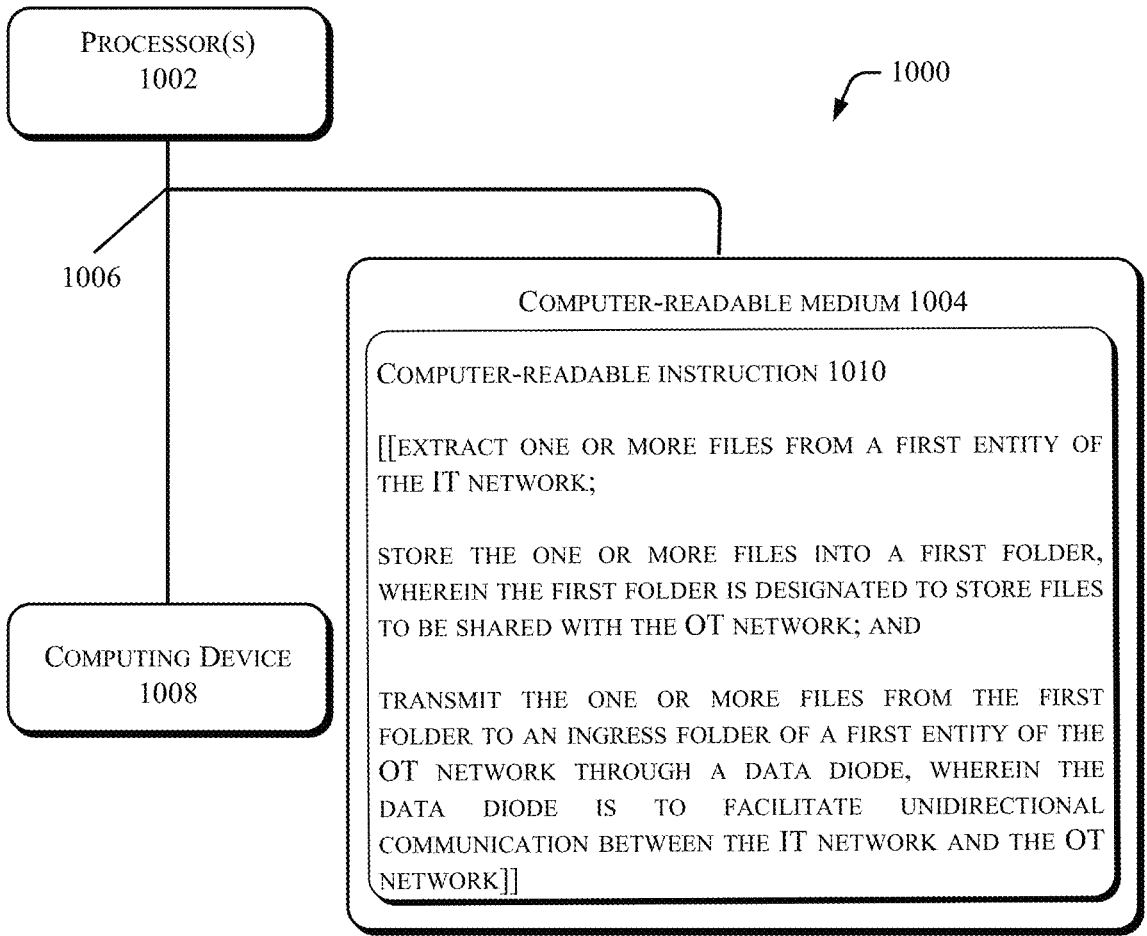
FIG. 10 illustrates a non-transitory computer-readable medium for secure communication between the OT network and the IT network, in accordance with an example of the present subject matter.

FIG. 10 illustrates a non-transitory computer-readable medium secure communication between an operational technology (OT) network and an information technology (IT) network, in accordance with an example of the present subject matter. In an example, the computing environment 1000 includes processor 1002 communicatively coupled to a non-transitory computer readable medium 1004 through communication link 1006. In an example implementation, the computing environment 1000 may be for example, the system 300 for secure communication between an operational technology (OT) network and an information technology (IT) network. In an example, the processor 1002 may have one or more processing resources for fetching and executing computer-readable instructions from the non-transitory computer readable medium 1004. The processor 1002 and the non-transitory computer readable medium 1004 may be implemented, for example, in the system for secure communication.

The non-transitory computer readable medium 1004 may be, for example, an internal memory device or an external memory. In an example implementation, the communication link 1006 may be a network communication link, or other communication links, such as a PCI (Peripheral component interconnect) Express, USB-C (Universal Serial Bus Type-C) interfaces, I2C (Inter-Integrated Circuit) interfaces, and the like. In an example implementation, the non-transitory computer readable medium 1004 includes a set of computer readable instructions 1010 which may be accessed by the processor 1002 through the communication link 1006 and subsequently executed for risk management. The processor (s) 1002 and the non-transitory computer readable medium 1004 may also be communicatively coupled to a computing device 1008 over the network.

Referring to FIG. 10, in an example, the non-transitory computer readable medium 1004 includes computer readable instructions 1010 that cause the processor 1002 to extract one or more files from a first entity of the IT network.

The instructions 1010 may further cause the processor 1002 to store the one or more files into a first folder, where the first folder is designated to store files to be shared with the OT network. Further, the instructions 1010 may cause the processor 1002 to transmit the one or more files from the first folder to an ingress folder of a first entity of the OT network through a data diode, where the data diode is to facilitate unidirectional communication between the IT network and the OT network.

The instructions 1010 may further cause the processor 1002 to trigger a flip operation on the data diode to transmit the one or more files from the first folder to the ingress folder of the first entity of the OT network. In one example, the instructions being executable by a processor is to trigger the flip operation on the data diode at pre-determined time intervals. In one example, the instructions 1010 may cause the processor 1002 to receive one or more files from an egress folder of the first entity of the OT network through the data diode and store the one or more files in a second folder, where the second folder is designated to store files to be shared with the IT network. The instructions 1010 may further cause the processor 1002 transmit the one or more files stored in the second folder to the first entity of the IT network.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A system for secure communication between an operational technology (OT) network and an information technology (IT) network, the system comprising:
   a data diode comprising a transmitting end and a receiving end to facilitate unidirectional communication between a source network and a destination network, wherein the source network and the destination network are any one of the OT network and the IT network;
   a folder-based data exchange module communicatively coupled to the receiving end of the data diode, wherein the folder-based data exchange module is to facilitate exchange of data between the source network and the destination network through one or more files, and wherein the one or more files include data to be communicated between the OT network and the IT network; and
   wherein the folder-based data exchange module comprises a first folder to store the one or more files designated for the destination network and a second folder to store the one or more files designated for the source network.

2. The system of claim 1, wherein the source network is the OT network, and the destination network is the IT network.

3. The system of claim 1, wherein the folder-based data exchange module is provided in a demilitarized zone (DMZ) of the OT network.

4. The system of claim 1, wherein the folder-based data exchange module is to
   extract one or more files designated for the OT network from the IT network;
   store the one or more files in the second folder of the folder-based data exchange module; and
   transmit the one or more files from the second folder of the folder-based data exchange module to an ingress folder of a first entity of the OT network.

5. The system of claim 4, wherein the first entity of the OT network is coupled to a transmitting end of the data diode.

6. The system of claim 4, wherein the first entity of the OT network further comprises:
   an egress folder to store one or more files designated for the IT network; and
   the ingress folder to receive one or more files designated for the OT network.

7. The system of claim 4, wherein the one or more files stored in the egress folder include data collected from one or more assets of a facility of the OT network.

8. The system of claim 4, wherein the first entity of the OT network comprises a transmitting module and the folder-based data exchange module comprises a receiving module, wherein the transmitting module of the first entity of the OT network is coupled to the receiving module of the folder-based data exchange module through an optical fiber.

9. The system of claim 1, wherein the data diode is triggered to reverse a data flow direction between the source network and the destination network.

10. A method for secure communication between an operational technology (OT) network and an information technology (IT) network, the method comprising:
    receiving, by a folder-based data exchange module, one or more files from an egress folder of a first entity of the OT network through a data diode coupled between the OT network and the IT network, wherein the data diode is to facilitate unidirectional communication between the OT network and the IT network, and wherein the folder-based data exchange module is to facilitate exchange of data between the first entity of the OT network and a first entity of the IT network;
    storing, by the folder-based data exchange module, the one or more files in a first folder of the folder-based data exchange module, wherein the first folder is designated to store files to be shared with the IT network; and
    transmitting, by the folder-based data exchange module, the one or more files stored in the first folder of the folder-based data exchange module to the first entity of the IT network.

11. The method of claim 10 further comprises:
    extracting, by the folder-based data exchange module, one or more files from the first entity of the IT network;
    storing, by the folder-based data exchange module, the one or more files in a second folder of the folder-based data exchange module, wherein the second folder is designated to store files to be shared with the OT network; and
    transmitting, by the folder-based data exchange module, the one or more files from the second folder to an ingress folder of the first entity of the OT network.

12. The method of claim 11, wherein transmitting, by the folder-based data exchange module, the one or more files from the second folder of the folder-based data exchange module to the ingress folder of the first entity of the OT network occurs on triggering a flip operation on the data diode.

13. The method of claim 12, wherein triggering the flip operation on the data diode is performed at pre-determined time intervals.

14. The method of claim 10, wherein the folder-based data exchange module is coupled to a receiver end of the data diode and the first entity of the OT network is coupled to a transmitting end of the data diode.

15. The method of claim 10, wherein the folder-based data exchange module is in a demilitarized zone (DMZ) of the OT network.

16. The method of claim 10, wherein receiving, by the folder-based data exchange module, the one or more files from the egress folder of the first entity includes data collected from one or more assets of a facility of the OT network.

17. A non-transitory computer-readable medium comprising instructions for secure communication between an operational technology (OT) network and an information technology (IT) network, the instructions being executable by a processor to:
    extract one or more files from a first entity of the IT network;
    store the one or more files into a first folder, wherein the first folder is designated to store files to be shared with the OT network; and
    transmit the one or more files from the first folder to an ingress folder of a first entity of the OT network through a data diode, wherein the data diode is to facilitate unidirectional communication between the IT network and the OT network.

18. The non-transitory computer-readable medium of claim 17, wherein the instructions being executable by a processor is to
    receive one or more files from an egress folder of the first entity of the OT network through the data diode;
    store the one or more files in a second folder, wherein the second folder is designated to store files to be shared with the IT network; and transmit the one or more files stored in the second folder to the first entity of the IT network.

19. The non-transitory computer-readable medium of claim 17, wherein the instructions being executable by a processor is to trigger a flip operation on the data diode to transmit the one or more files from the first folder to the ingress folder of the first entity of the OT network.

20. The non-transitory computer-readable medium of claim 19, wherein the instructions being executable by a processor is to trigger the flip operation on the data diode at pre-determined time intervals.

* * * * *